(12) United States Patent
Nishiwaki (10) Patent No.: US 8,531,844 B2
(45) Date of Patent: Sep. 10, 2013

(54) SLIDING PORTABLE ELECTRONIC DEVICE

(75) Inventor: Masahiko Nishiwaki, Daito (JP)

(73) Assignee: Kyocera Corporation, Kyoto (JP)

( * ) Notice: Subject to any disclaimer, the term of this patent is extended or adjusted under 35 U.S.C. 154(b) by 312 days.

(21) Appl. No.: 12/679,474

(22) PCT Filed: Sep. 26, 2008

(86) PCT No.: PCT/JP2008/067480
§ 371 (c)(1),
(2), (4) Date: Mar. 22, 2010

(87) PCT Pub. No.: WO2009/041610
PCT Pub. Date: Apr. 2, 2009

(65) Prior Publication Data
US 2010/0195296 A1 Aug. 5, 2010

(30) Foreign Application Priority Data
Sep. 28, 2007 (JP) .................................. 2007-252996

(51) Int. Cl.
*H05K 5/00* (2006.01)

(52) U.S. Cl.
USPC ............... 361/752; 361/679.08; 361/679.17; 361/679.56; 361/730; 455/550.1; 49/373

(58) Field of Classification Search
USPC ............... 361/752, 679.08, 679.17, 679.56, 361/730; 455/550.1; 49/373
See application file for complete search history.

(56) References Cited

U.S. PATENT DOCUMENTS

| 7,420,770 B2 * | 9/2008 | Ho et al. | 360/97.01 |
| 2007/0025071 A1 * | 2/2007 | Yokote et al. | 361/680 |
| 2007/0238494 A1 * | 10/2007 | Pan | 455/575.4 |
| 2007/0270180 A1 * | 11/2007 | Takagi | 455/550.1 |
| 2007/0275774 A1 * | 11/2007 | Fagrenius et al. | 455/575.4 |
| 2009/0044206 A1 * | 2/2009 | Onuma et al. | 720/601 |
| 2009/0052126 A1 * | 2/2009 | Komiyama | 361/679.56 |
| 2009/0067138 A1 * | 3/2009 | Oliver et al. | 361/730 |
| 2009/0165388 A1 * | 7/2009 | Liu et al. | 49/373 |
| 2011/0000712 A1 * | 1/2011 | Kasuga et al. | 174/650 |

FOREIGN PATENT DOCUMENTS

| JP | 50-92398 | 8/1974 |
| JP | 64-37322 | 3/1989 |
| JP | 2003-110675 | 4/2003 |
| JP | 2004153597 A * | 5/2004 |

(Continued)

OTHER PUBLICATIONS

International Search Report for PCT/JP2008/067480, mailed on Jan. 6, 2009.

*Primary Examiner* — Xiaoliang Chen
(74) *Attorney, Agent, or Firm* — Duane Morris LLP (57) ABSTRACT

Provided is a sliding portable electronic device having a waterproof structure which does not restrict a circuit design. Provided is a sliding portable electronic device having a waterproof structure which does not restrict a circuit design. The sliding portable electronic device according to the present invention comprises a pair of housings engaging slidably with each other. An electric component built in one housing is connected to an electric component built in the other housing through a flexible lead. The other housing is provided with an opening, through which the flexible lead passes, and the opening is blocked by a waterproof sheet. The flexible lead, which is drawn out from the electric component of the one casing, passes between the abutment surfaces of the waterproof sheet and the other casing and is connected to the electric component of the other housing.

4 Claims, 10 Drawing Sheets

(56) References Cited

FOREIGN PATENT DOCUMENTS

| | | |
|---|---|---|
| JP | 2006-157465 | 6/2006 |
| WO | WO-2007/100023 | 9/2007 |
| WO | WO 2007100023 A1 * | 9/2007 |

* cited by examiner

SLIDING PORTABLE ELECTRONIC DEVICE

This is a U.S. National Phase Application of International Application No. PCT/JP2008/067480 filed Sep. 26, 2008, which claims priority to Japanese Patent Application No. 2007-252996 filed Sep. 28, 2007, the disclosures of which are incorporated herein by reference in their entirety.

TECHNICAL FIELD

The present invention relates to a sliding portable electronic device comprising a pair of housings engaging slidably with each other such as a sliding portable telephone.

BACKGROUND ART

Figure 9:
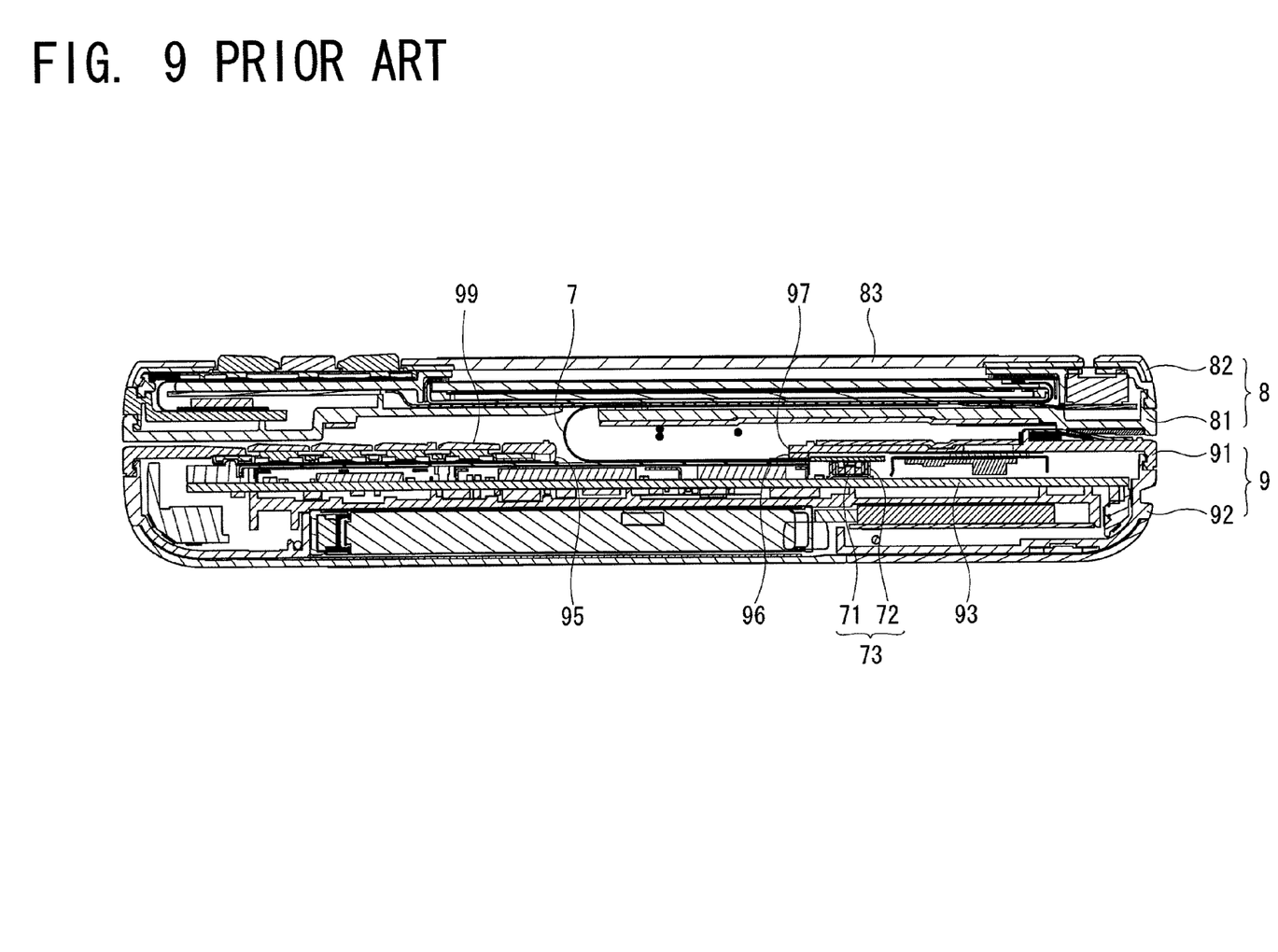
FIG. 9 is a cross-sectional view of a conventional sliding portable telephone.

In the sliding portable telephone, as shown in FIG. 9, a display side housing 8 including a display 83 and an operation side housing 9 including an operation key 99 engage slidably with each other, and the display 83 of the display side housing 8 is connected to a circuit board 93 in the operation side housing 9 through a flexible lead 7.

The display side housing 8 comprises a display side front case half body 81 and a display side rear case half body 82, while the operation side housing 9 comprises an operation side front case half body 91 and an operation side rear case half body 92. The operation side front case half body 91 of the operation side housing 9 is provided with an aperture 97 through which the flexible lead 7 passes.

Figure 10:
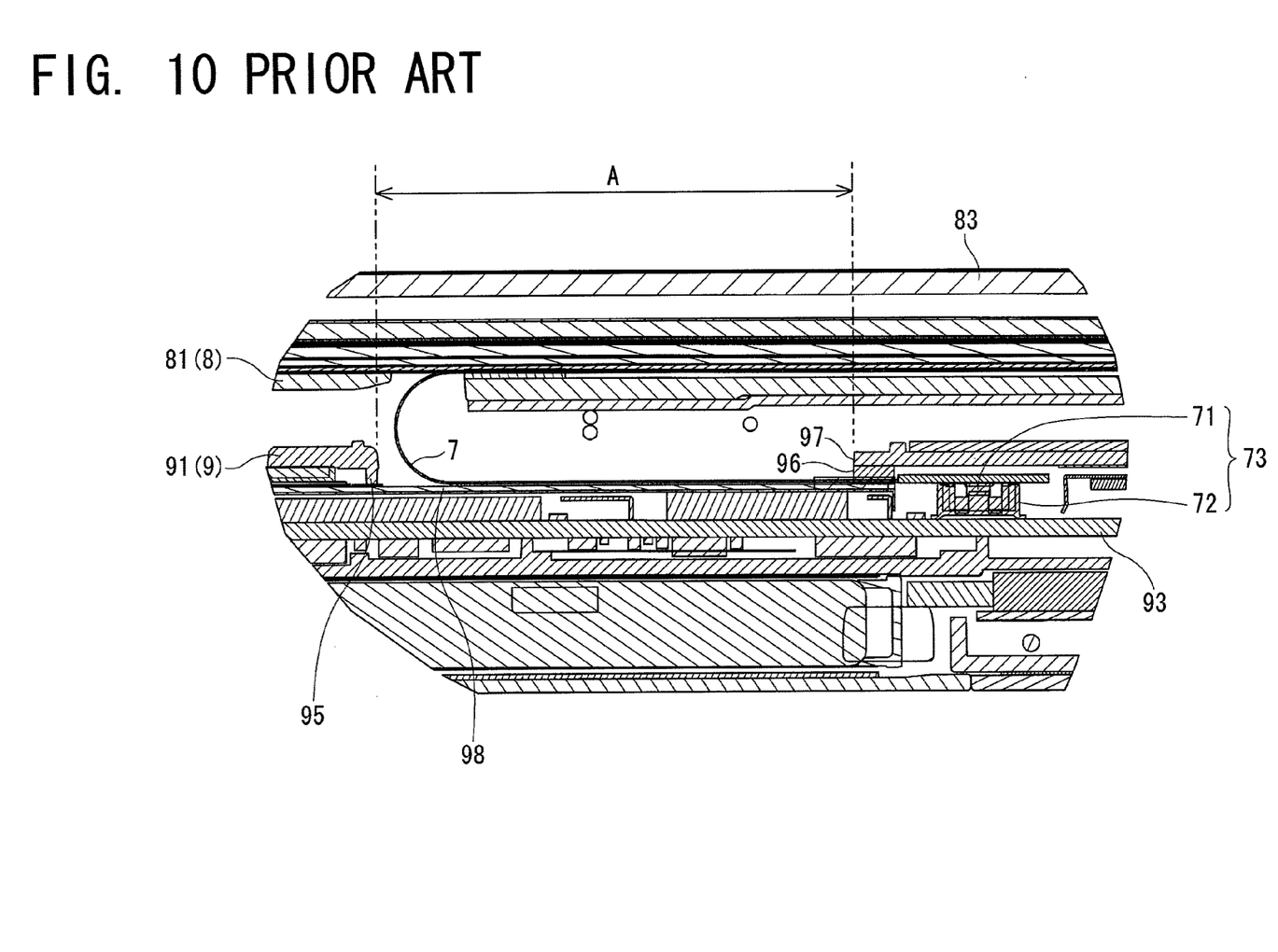
FIG. 10 is a cross-sectional view showing an essential part of the sliding portable telephone.

As shown in FIG. 10, the flexible lead 7 drawn out from inside of the display side housing 8 curves in a space including the aperture 97 of the operation side housing 9, and then extends along a surface of a metal plate 98 placed in the operation side housing 9, and further passes between facing surfaces of a sponge member 96 attached and fixed on an inner surface of the operation side front case half body 91 and the metal plate 98. A male connector 71 coupled to a tip end part of the flexible lead 7 fits in a female connector 72 on a circuit board 93.

Also, in order to prevent moisture which enters from between the display side housing 8 and the operation side housing 9 from passing through the aperture 97 to invade to a connector structure 73 comprising the male connector 71 and the female connector 72, on the operation side front case half body 91 of the operation side housing 9, a waterproof rib 95 of a height reaching the surface of the metal plate 98 projects along three sides of an opening edge surrounding the aperture 97 other than one side to which the sponge member 96 is attached. The waterproof rib 95 and the sponge member 96 form a waterproof wall structure surrounding the aperture 97.

DISCLOSURE OF THE INVENTION

Problems to be Solved by the Invention

In a case where the waterproof wall structure shown in FIG. 10 is employed, it is necessary to arrange the connector structure 73 on the circuit board 93 inside of the waterproof wall structure, namely outside of an area A where the opening 97 is formed.

However, in portable telephones having higher and higher packaging density of the circuit board 93 with a multi-functionalization in recent years, when a position of the connector structure 73 on the circuit board 93 is limited as discussed above, there is a problem of great restriction on a circuit design.

An object of the present invention is to provide a sliding portable electronic device including a waterproof structure which does not restrict a circuit design.

Means for Solving the Problem

In a sliding portable electronic device according to the present invention, a pair of housings 1, 2 engages slidably with each other, and an electrical component built in one housing 1 is connected to an electrical component built in the other housing 2 through a flexible lead 3.

Here, the other housing 2 is provided with an aperture 25 through which the flexible lead 3 passes, the opening 25 is blocked by a waterproof sheet 5, and the flexible lead 3 drawn out from the electrical component of the one housing 1 passes between abutting surfaces of the waterproof sheet 5 and the other housing 2, and is connected to the electrical component of the other housing 2.

In the sliding portable electronic device of the present invention described above, since the opening 25 provided in the other housing 2 is blocked by the waterproof sheet 5, a tip end part of the flexible lead 3 can be connected to a circuit board 6 in an area overlapping with the aperture 25 in the housing 2 through an electrical component in the housing 2, e.g., a connector structure 4 on the circuit board 6.

Specifically, the flexible lead 3 drawn out from the electrical component of the one housing 1 extends along a surface of the waterproof sheet 5, and then is folded back from front side to back side of the waterproof sheet 5, and is connected to the electrical component of the other housing 2 in an area where the tip end part thereof overlaps with the aperture 25.

Therefore, according to the sliding portable electronic device of the present invention, there is no restriction due to arrangement of a connection part such as the connector structure 4, and degrees of freedom of the circuit design thereby increase.

In a further particular configuration, a base end part of the waterproof sheet 5 is attached and fixed to the other housing 2, and a peripheral edge part of the waterproof sheet 5 other than the base end part faces the other housing 2 so that the peripheral edge part can be in close contact with the other housing 2. The flexible lead 3 passes between facing surfaces of the tip end part of the waterproof sheet 5 and the other housing 2, and thereafter, is folded back from front side to back side of the waterproof sheet 5, and the peripheral edge part of the waterproof sheet 5 other than the base end part thereof is pressed against the housing 2 along with the assembly of the other housing 2.

In an assembly process of the sliding portable electronic device having this particular configuration, when both the housings 1, 2 are assembled together in the state where both the housings 1, 2 are connected to each other by the flexible lead 3, the waterproof sheet 5 bends in a direction away from the one housing 1 at the base end part, and therefore, it is possible to secure a space for connecting the tip end part of the flexible lead 3 to the electrical component of the other housing 2, thereby making a connection work easy.

Effect of the Invention

With the sliding portable electronic device according to the present invention, it is possible to realize a waterproof structure which does not restrict a circuit design.

EXPLANATION OF REFERENCE NUMERALS 1 display side housing
11 display side rear case half body
12 display side front case half body
13 display
2 operation side housing
21 operation side front case half body
22 operation side rear case half body
25 aperture
3 flexible lead
4 connector structure
41 female connector
42 male connector
5 waterproof sheet
51 sponge member
6 circuit board

BEST MODE FOR CARRYING OUT THE INVENTION

An embodiment in which the present invention is implemented in a sliding portable telephone is to be described in detail below with reference to the drawings.

Figure 1:
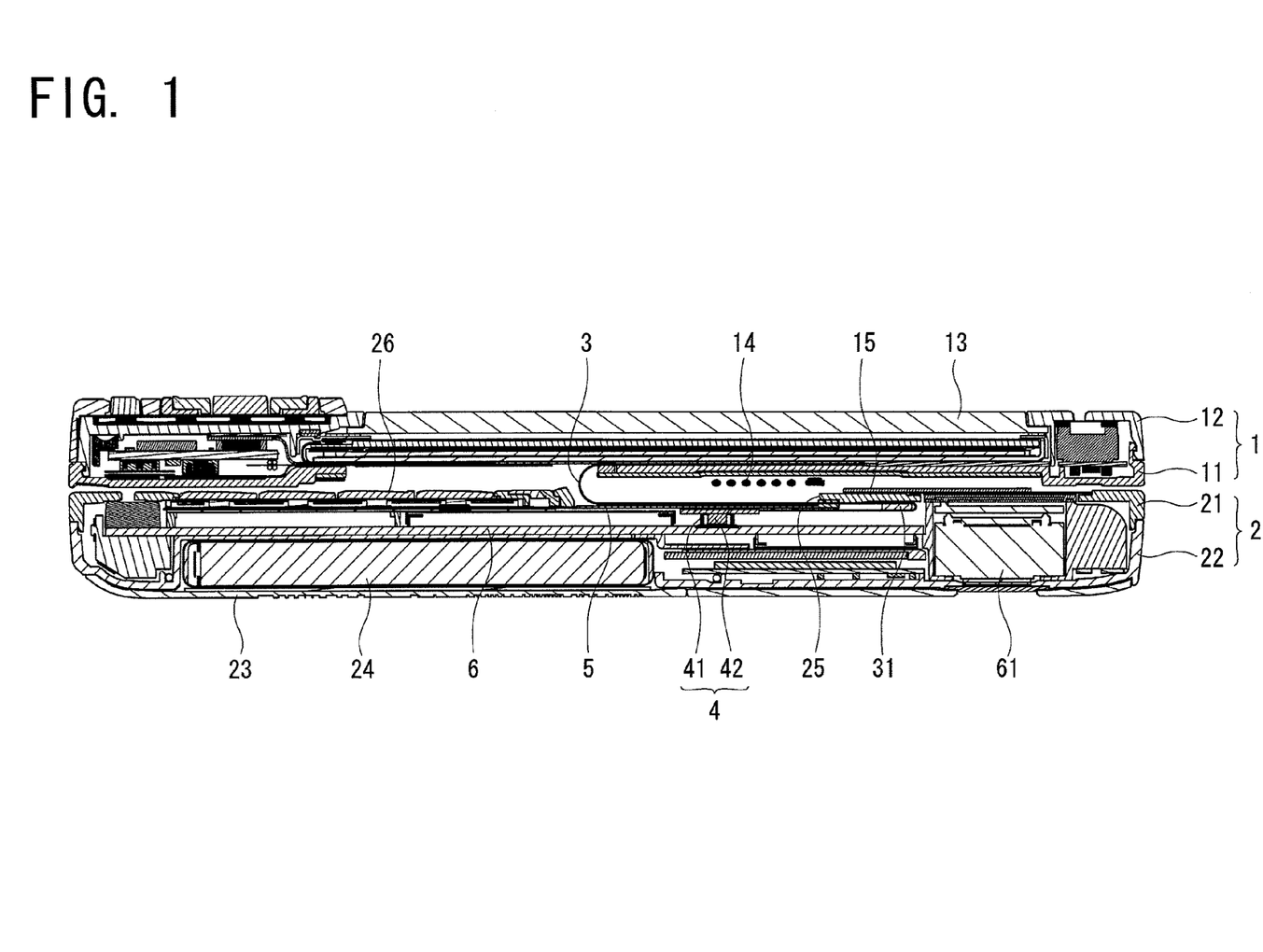
FIG. 1 is a cross-sectional view of a sliding portable telephone according to the present invention.

As shown in FIG. 1, a sliding portable telephone according to the present invention comprises a display side housing 1 and an operation side housing 2 engaging slidably with each other, a display 13 is arranged on a front surface of the display side housing 1, a plurality of operation keys including a numerical keypad are arranged on a front surface of the operation side housing 2, the operation keys 26 can be exposed so as to be operable by sliding the display side housing 1 from a closed position to an open position.

The display side housing 1 comprises a display side rear case half body 11 and a display side front case half body 12 joined together, and the operation side housing 2 comprises an operation side front case half body 21 and an operation side rear case half body 22 joined together.

Figure 5:
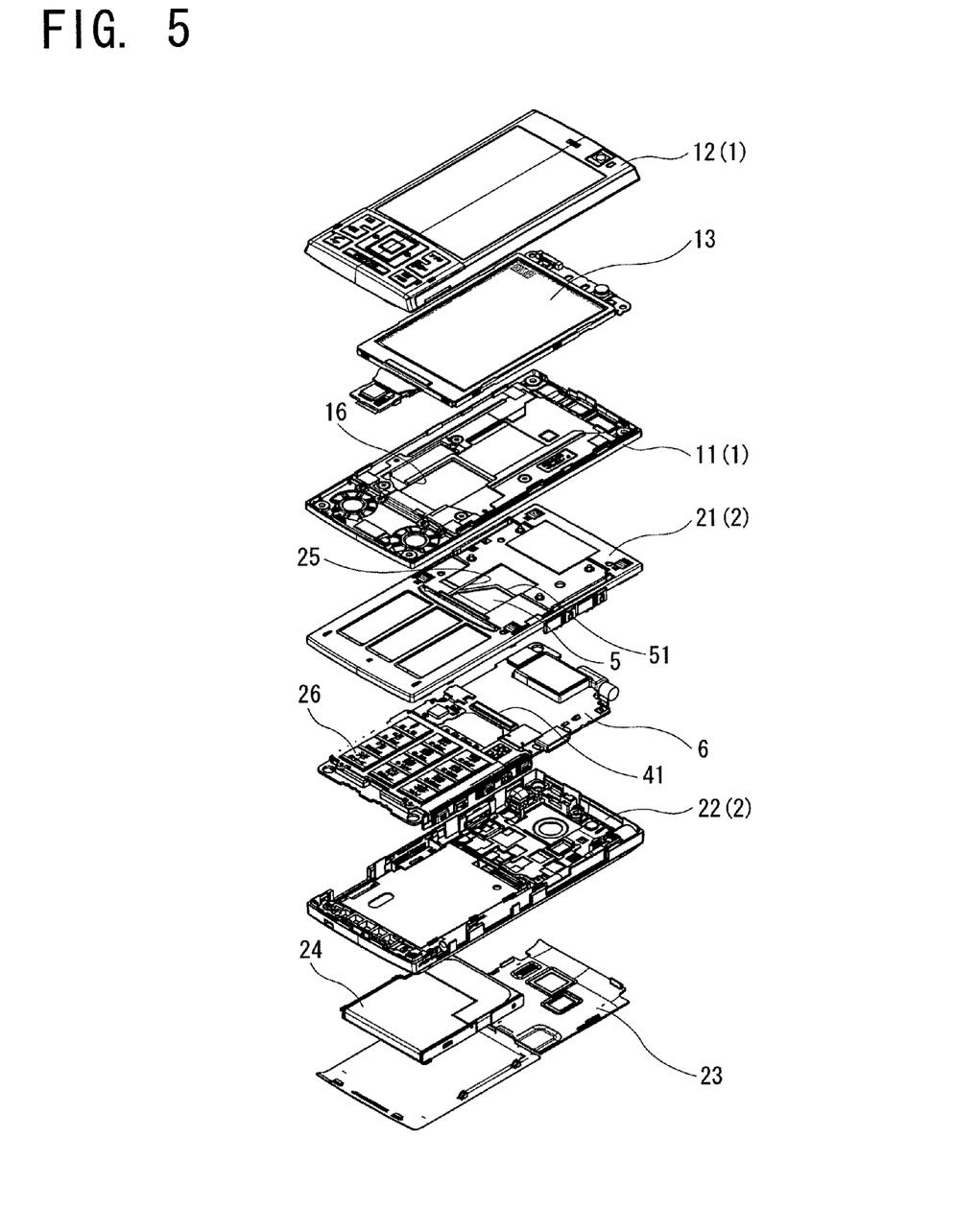
FIG. 5 is an exploded perspective view of the sliding portable telephone.
Figure 6:
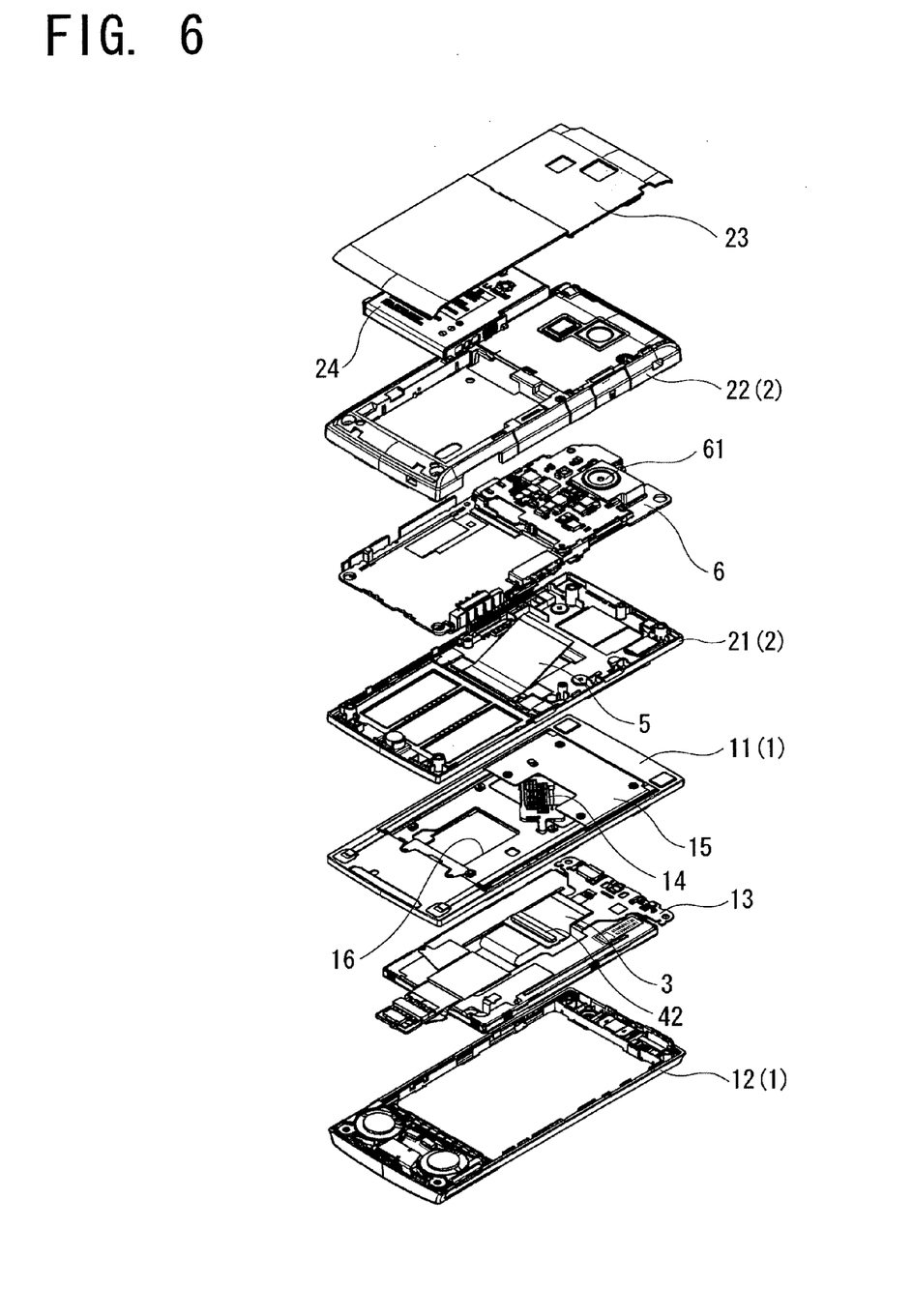
FIG. 6 is an exploded perspective view of the sliding portable telephone shown from an opposite direction to in FIG. 5.

As shown in FIGS. 5 and 6, the display 13 is placed between the display side rear case half body 11 and the display side front case half body 12 forming the display side housing 1. In contrast, a circuit board 6 including the plurality of operation keys 26 and a camera 61 are placed between the operation side front case half body 21 and the operation side rear case half body 22 forming the operation side housing 2. An accommodation room of a battery 24 is formed on a rear surface of the operation side rear case half body 22, and the battery accommodation room is covered by a rear panel 23.

Also, in the display side rear case half body 11 of the display side housing 1, a slide plate 15 and a spring 14 urging the slide plate 15 are placed, and the slide plate 15 is coupled to the operation side front case half body 21 of the operation side housing 2 to realize slide between the display side housing 1 and the operation side housing 2, and urging by a spring to both directions.

As shown in FIG. 1, the display 13 of the display side housing 1 is connected to the circuit board 6 of the operation side housing 2 through the flexible lead 3. In particular, a male connector 42 coupled to a tip end part of the flexible lead 3 fits in a female connector 41 installed on the circuit board 6 of the operation side housing 2, and the male connector 42 and the female connector 41 form a connector structure 4.

As shown in FIGS. 5 and 6, the display side rear case half body 11 of the display side housing 1 is provided with an aperture 16 through which the flexible lead 3 is to pass, and the operation side front case half body 21 of the operation side housing 2 is provided with an aperture 25 through which the flexible lead 3 is to pass. The aperture 25 of the operation side front case half body 21 is blocked by a waterproof sheet 5 made of PET.

Figure 7:
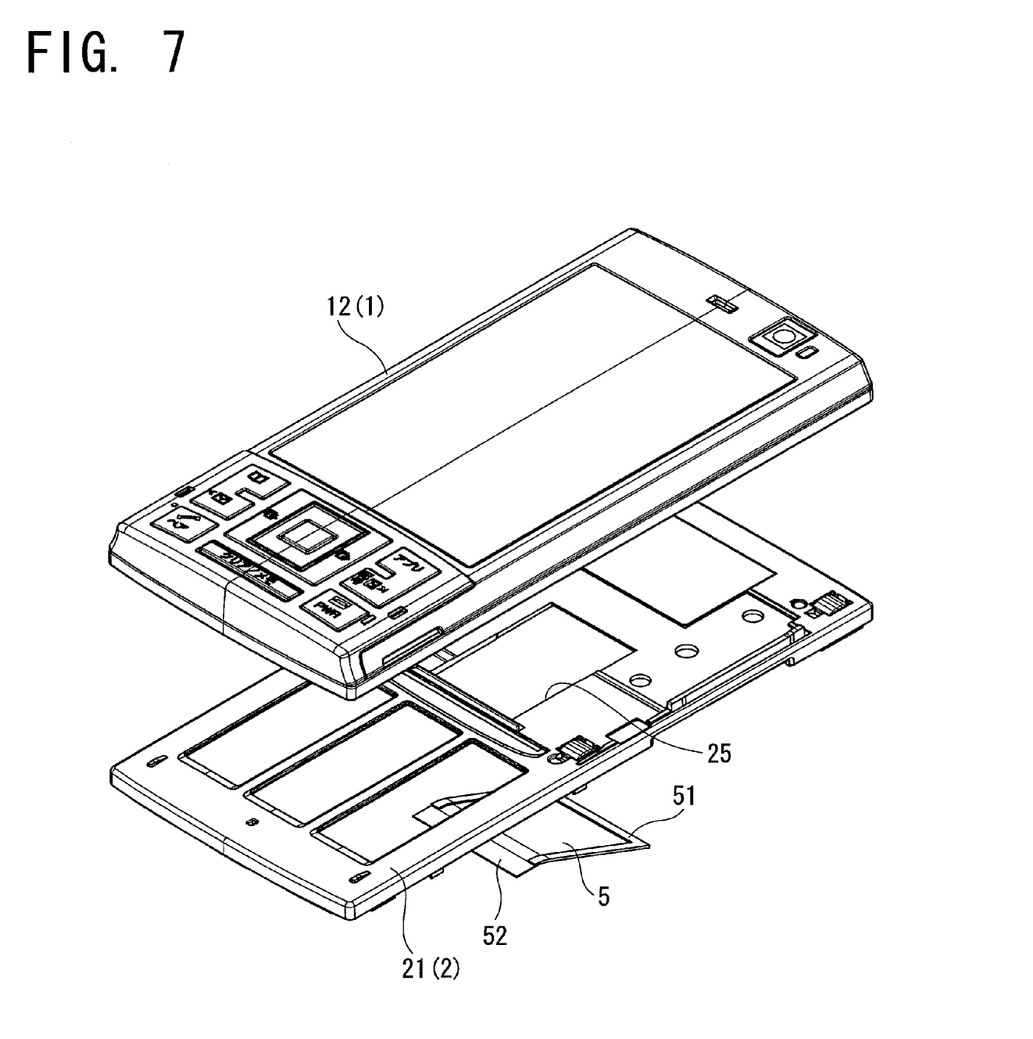
FIG. 7 is an exploded perspective view of a display side housing, an operation side front case half body and a waterproof sheet.
Figure 8:
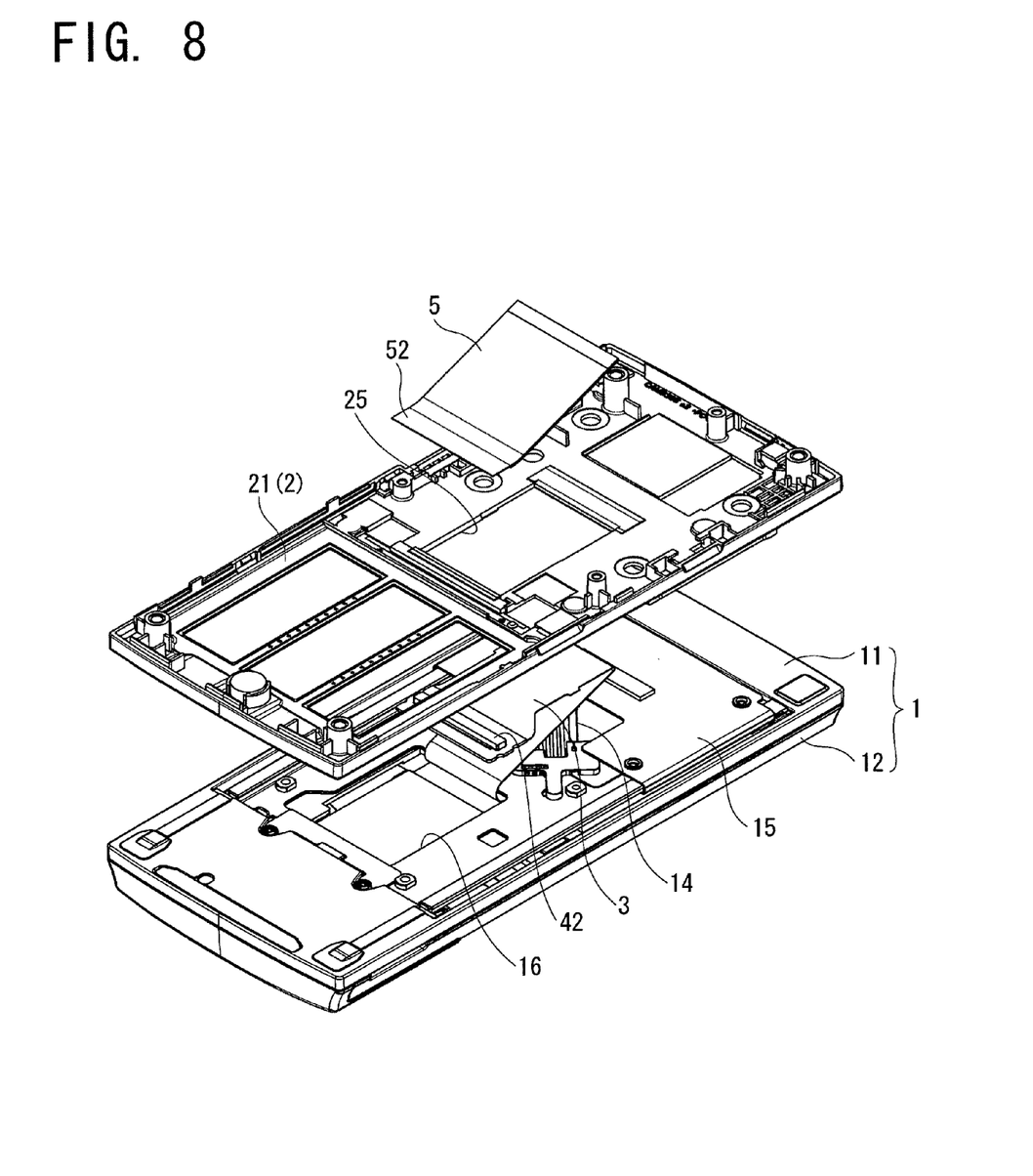
FIG. 8 is an exploded perspective view of the waterproof sheet, the operation side front case half body and the display side housing shown from an opposite direction to in FIG. 7.

As shown in FIGS. 7 and 8, the waterproof sheet 5 has a rectangular shape, and one side of a base end part 52 thereof is attached and fixed to an inner surface of the operation side front case half body 21. Also, a U-shaped sponge member 51 is attached and fixed to other three sides of peripheral edge part of the waterproof sheet 5 on facing parts with the operation side front case half body 21, and the sponge member 51 faces the inner surface of the operation side front case half body 21.

Figure 2:
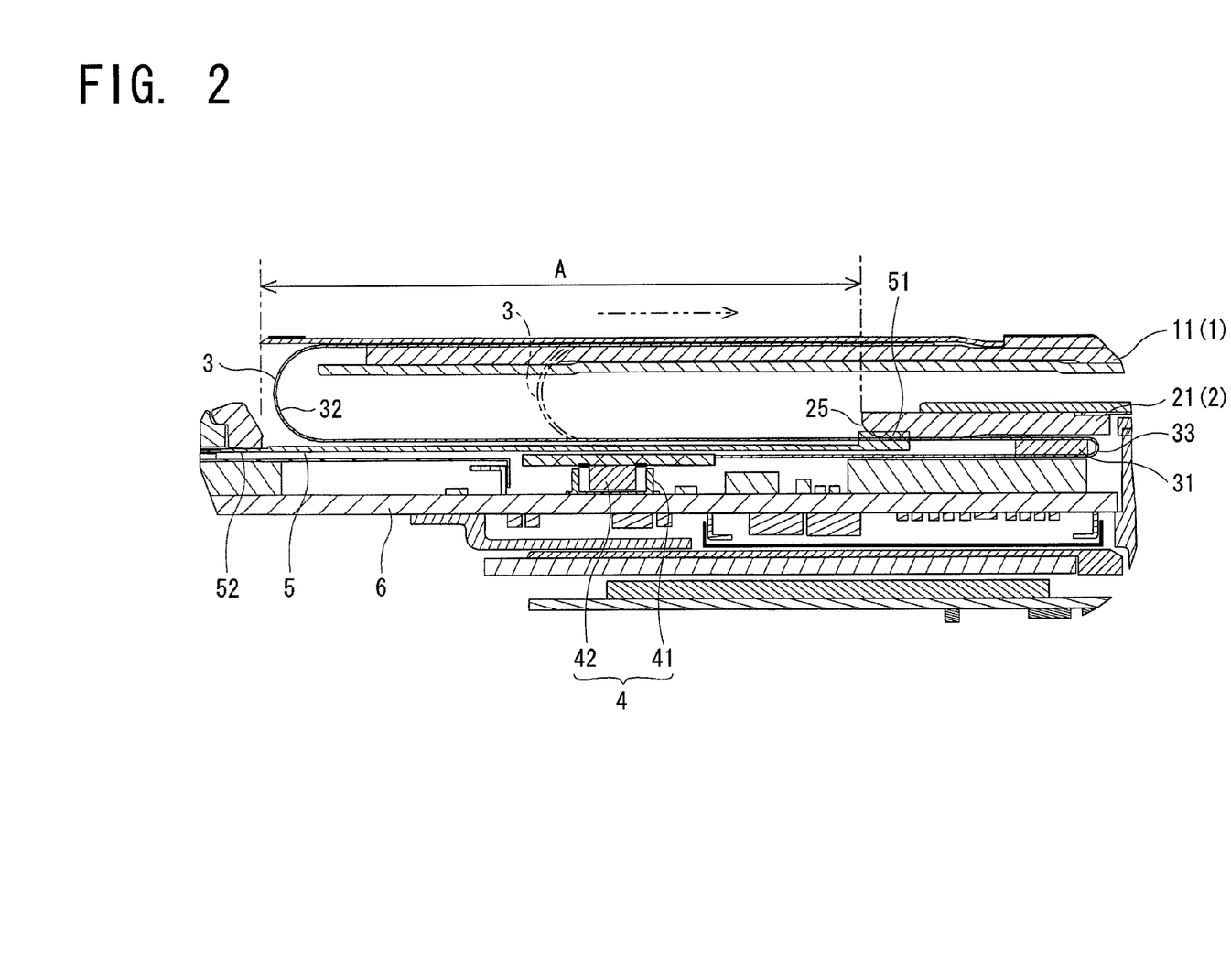
FIG. 2 is a cross-sectional view showing an essential part of the sliding portable telephone.

As shown in FIG. 2, the flexible lead 3 drawn out from the display side housing 1 includes a curved section 32 curving in a U-shape in a space including the aperture 25 of the operation side front case half body 21. A tip end side of the flexible lead 3 from the curved section 32 extends along a surface of the waterproof sheet 5, and thereafter passes between the operation side front case half body 21 and the sponge member 51, and is further folded back 180 degrees from front side to back side of the waterproof sheet 5, and the tip end part thereof reaches an area A where the aperture 25 is formed. And the male connector 42 coupled to the tip end part fits in the female connector 41 on the circuit board 6.

A two-sided adhesive tape 31 is arranged on a folded part 33 of the flexible lead 3 to mark a fold line on the flexible lead 3.

In the above described sliding portable telephone, when the display side housing 1 slides from the closed position toward the open position as indicated by a chain line arrow in FIG. 2, the curved section 32 of the flexible lead 3 moves as indicated by chain lines in the figure to allow separation of the display side housing 1 and the operation side housing 2 in a sliding direction.

In the sliding portable telephone of the present invention, although the connector structure 4 is arranged within the area A where the aperture 25 of the operation side front case half body 21 is formed, since the opening 25 is blocked by the waterproof sheet 5, even if moisture enters between the display side housing 1 and the operation side housing 2, invasion of the moisture into the operation side housing 2 is prevented by the waterproof sheet 5, and the moisture does not reach the connector structure 4.

Therefore, the position of the connector structure 4 on the circuit board 6 is not limited by a relationship with the area A where the aperture 25 is formed. In the depicted example, the connector structure 4 is arranged within the area A where the aperture 25 is formed.

Figure 3:
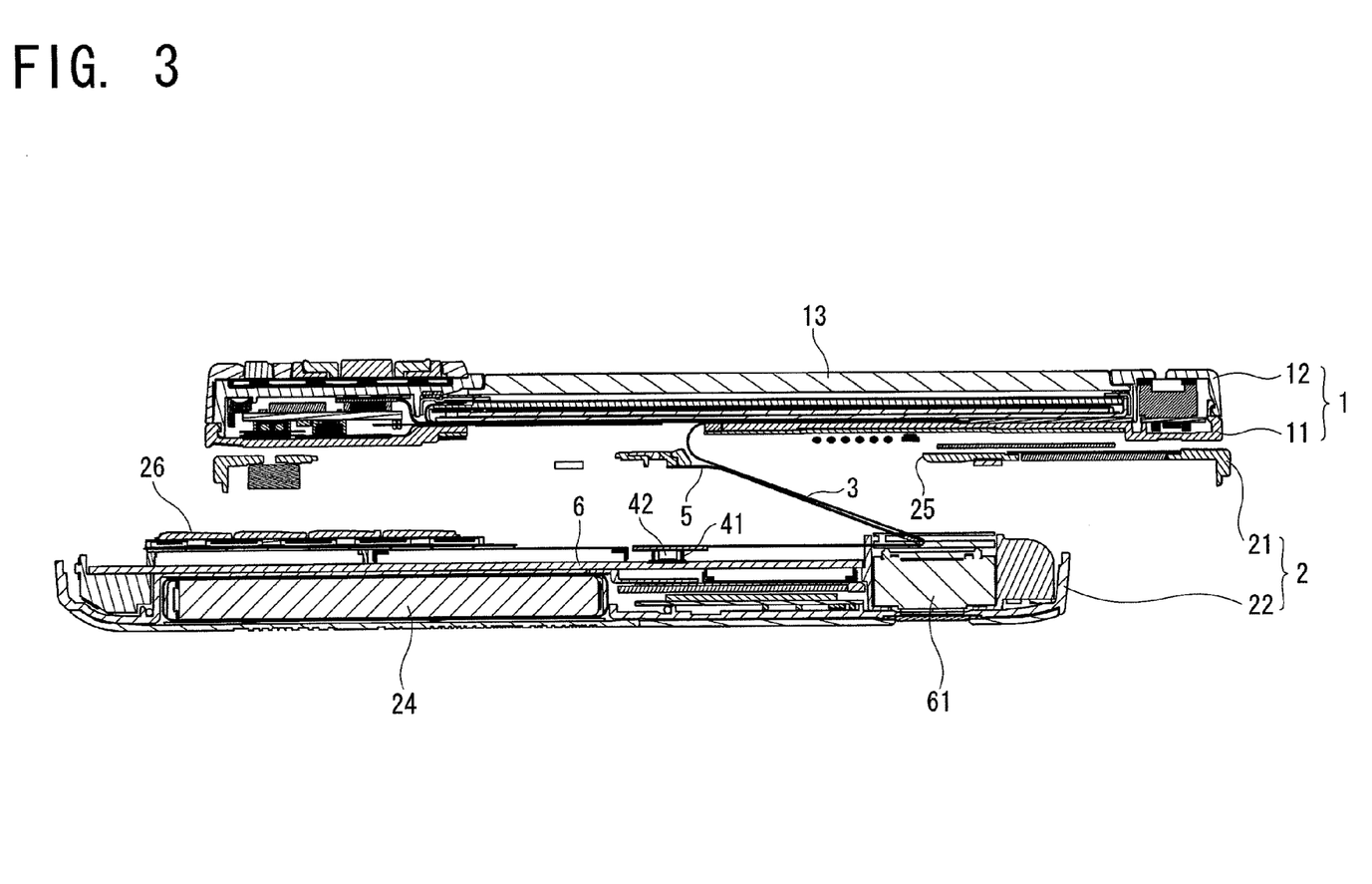
FIG. 3 is a cross-sectional view of an assembly process of the sliding portable telephone.
Figure 4:
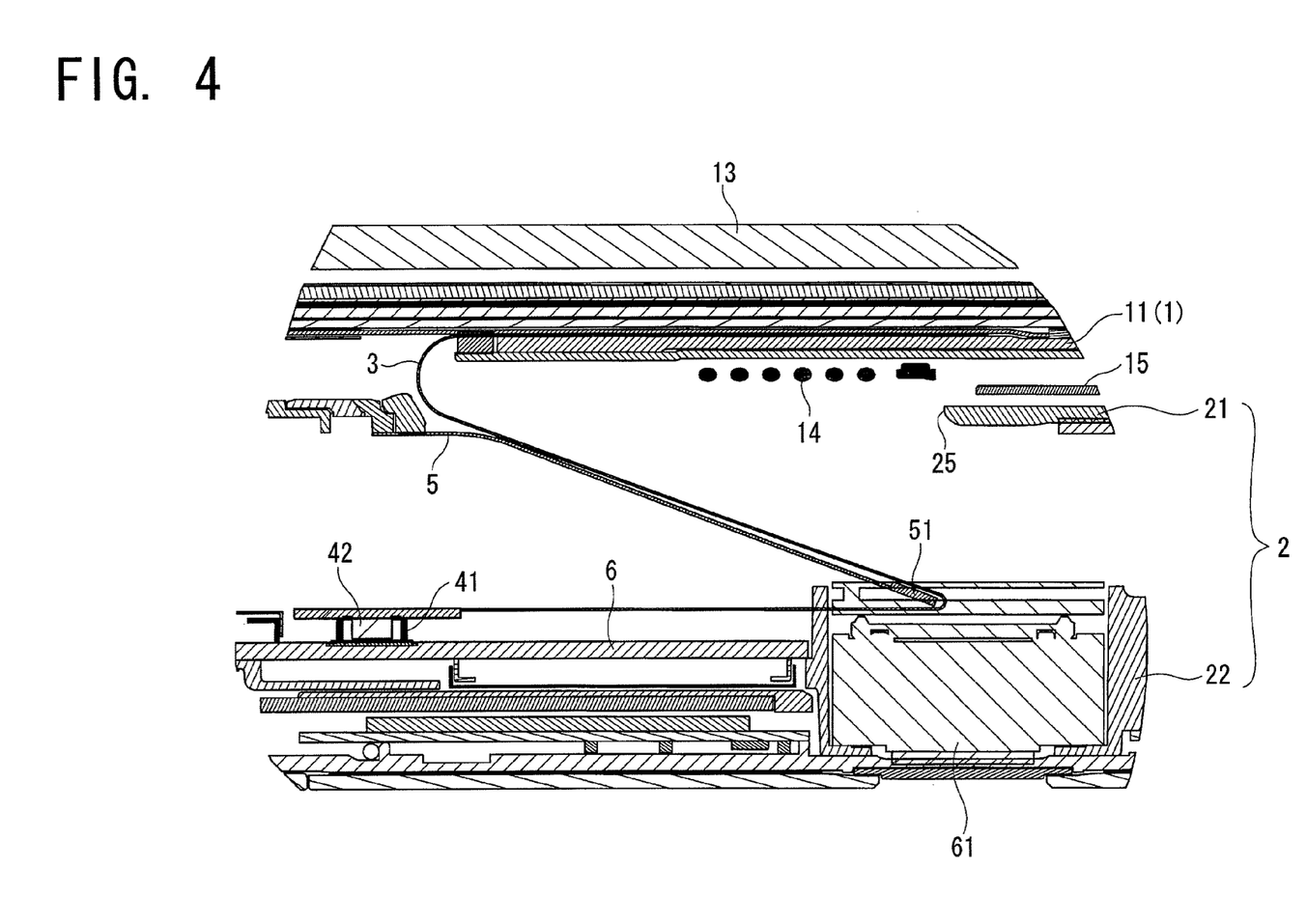
FIG. 4 is a cross-sectional view showing an essential part of the assembly process of the sliding portable telephone.

In the assembly process of the sliding portable telephone of the present invention, as shown in FIGS. 3 and 4, while the display side rear case half body 11 and the display side front case half body 12 are joined together to assemble the display side housing 1, the male connector 42 attached to the tip end part of the flexible lead 3 drawn out from the display 13 of the display side housing 1 is fitted in the female connector 41 on the circuit board 6 placed in the operation side rear case half body 22 in a state where the operation side front case half body 21 and the operation side rear case half body 22 of the operation side housing 2 are not yet joined together.

In this work, it is necessary to secure a space for the work within margin of a length of the flexible lead 3, by separating the display side housing 1 and the operation side front case half body 21 from each other, and this separation makes the flexible lead 3 extend in an oblique direction from the display side housing 1 side to the operation side front case half body 21 side. Along with this, the waterproof sheet 5 bends to the operation side rear case half body 22 side at the base end part thereof.

Therefore, it is possible to fit the male connector 42 in the female connector 41 without completely removing the waterproof sheet 5 from the operation side front case half body 21.

Thereafter, the operation side front case half body 21 and the operation side rear case half body 22 are joined together to assemble the operation side housing 2. Along with this assembly, the waterproof sheet 5 returns to a plane shape, and the sponge member 51 attached to the waterproof sheet 5 is pressed against the inner surface of the operation side front case half body 21. The opening 25 is thereby blocked to complete a waterproof structure.

According to the sliding portable telephone of the present invention described above, the connector structure 4 on the circuit board 6 built in the operation side housing 2 can be arranged freely without being bound by the positional relation with the aperture 25 formed in the display side rear case half body 11 of the display side housing 1. Therefore, the degrees of freedom of the circuit design of the circuit board 6 increase, and therefore, the packaging density of the circuit board 6 can be increased.

The present invention is not limited to the foregoing embodiment in construction but can be modified variously within the technical range set forth in the appended claims. For example, in the above example, the connector structure 4 on the circuit board 6 is arranged within the area A where the aperture 25 of the operation side front case half body 21 is formed. However, not limited to this, it can be arranged outside of the area A.

Also, in the above example, the waterproof structure with the waterproof sheet 5 of the present invention is realized in the operation side housing 2. However, alternatively, a similar waterproof structure can be provided in the display side housing 1, or a similar waterproof structure can be provided in both the display side housing 1 and the operation side housing 2.

What is claimed is:

1. A sliding portable electronic device comprising a pair of housings engaging slidably with each other, a first electrical component contained in a first housing being connected to a second electrical component contained in a second housing through a flexible lead, wherein the second housing is provided with an aperture through which the flexible lead passes, wherein the aperture extends along a surface of the second housing facing the first housing and is blocked by a waterproof sheet,
   wherein a base end portion of the waterproof sheet is turnably attached and fixed to the second housing, a peripheral edge portion of the waterproof sheet other than the base end portion faces the second housing so that the waterproof sheet can bend toward the first housing at the base end portion and the peripheral edge portion can be in close contact with the second housing, and
   wherein the flexible lead extends from the first electrical component of the first housing and passes between the peripheral edge portion of the waterproof sheet and the second housing, and makes electrical contact with the second electrical component of the second housing.

2. The sliding portable electronic device according to claim 1, wherein the peripheral edge portion of the waterproof sheet is pressed against the edge of the aperture formed on the second housing during assembly of the second housing.

3. The sliding portable electronic device according to claim 2, wherein a circuit board is contained in the second housing, and the first connector is connected to the circuit board through a second connector on the circuit board.

4. The sliding portable electronic device according to claim 1, wherein a circuit board is contained in the second housing, and the first connector is connected to the circuit board through a second connector on the circuit board.

* * * * *